(12) United States Patent
Kasamatsu et al.

(10) Patent No.: US 6,754,043 B2
(45) Date of Patent: Jun. 22, 2004

(54) HEAD SLIDER

(75) Inventors: Yoshiharu Kasamatsu, Atsugi (JP);
Ryosuke Koishi, Atsugi (JP); Takayuki Yamamoto, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/380,101

(22) PCT Filed: Dec. 16, 1998

(86) PCT No.: PCT/JP98/05684
§ 371 (c)(1),
(2), (4) Date: Aug. 23, 1999

(65) Prior Publication Data
US 2002/0041468 A1 Apr. 11, 2002

(30) Foreign Application Priority Data
Dec. 26, 1997 (JP) ............................ 9-358783

(51) Int. Cl.⁷ ................................ G11B 5/60
(52) U.S. Cl. ................. 360/235.8; 360/235.7; 360/235.9
(58) Field of Search .......... 360/235.4, 235.9, 360/236, 236.1, 236.9, 237, 237.1, 236.6, 236.7, 236.8, 235.7, 235.8; 216/22

(56) References Cited
U.S. PATENT DOCUMENTS

| | | | | |
|---|---|---|---|---|
| 5,343,343 A | * | 8/1994 | Chapin | 360/236.1 |
| 5,841,608 A | * | 11/1998 | Kasamatsu et al. | 360/26.6 |
| 5,894,379 A | * | 4/1999 | Koishi et al. | 360/236.2 |
| 6,040,958 A | * | 3/2000 | Yamamoto et al. | 360/236.3 |
| 6,055,129 A | * | 4/2000 | Park et al. | 360/216.3 |
| 6,072,663 A | * | 6/2000 | Yokohata et al. | 360/236.1 |
| 6,120,694 A | * | 9/2000 | Kasamatsu et al. | 216/22 |
| 6,130,808 A | * | 10/2000 | Yotsuya | 360/235.4 |
| 6,134,083 A | * | 10/2000 | Warmka | 360/235.6 |

FOREIGN PATENT DOCUMENTS

| | | |
|---|---|---|
| JP | 2173988 | 7/1990 |
| JP | 7105651 | 4/1995 |
| JP | 9293223 | 11/1997 |

* cited by examiner

*Primary Examiner*—Tianjie Chen
(74) *Attorney, Agent, or Firm*—Greer, Burns & Crain, Ltd.

(57) ABSTRACT

The head slider mounts a recording/reproducing element and flies over a recording medium with the airflow generated when the recording medium moves. The head slider comprises a slider body having an air inflow end and an air outflow end, a rail projected from the slider body to define an air bearing surface extended to the outflow end, a projection formed on the rail and between the inflow end and the outflow end, and a recess formed at the outflow end of the rail to make narrow the width of the rail. When the recording medium stops, the head slider and the recording medium are in contact at the projection and the air outflow end of the rail. Since the outflow end of the rail is narrow in width, the stiction can be prevented. Moreover, it is unnecessary to form a projection near the outflow end of the rail and thereby the flying height of the recording/reproducing element can be lowered to improve the recording/reproducing sensitivity.

8 Claims, 9 Drawing Sheets

HEAD SLIDER

FIELD OF THE INVENTION

The present invention relates to a head slider which is used in a magnetic disk drive or the like. The head slider mounts a recording/reproducing element and is also arranged on a recording medium to fly over the recording medium owing to the airflow generated by movement of the recording medium.

In more specific, the present invention relates to a head slider having projections at the sliding surface, which are suitable for avoiding the stiction between the head slider and the recording medium.

BACKGROUND OF THE INVENTION

Figure 1A:
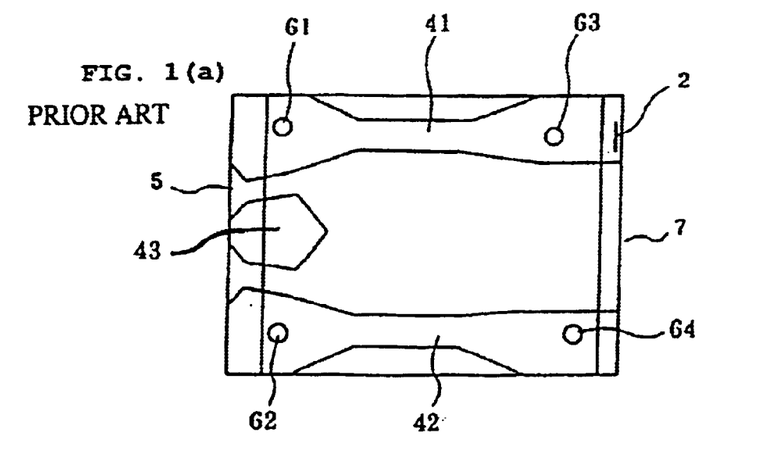
FIG. 1(a) is a front elevation viewed from a side of the floating rail forming surface.
Figure 1B:
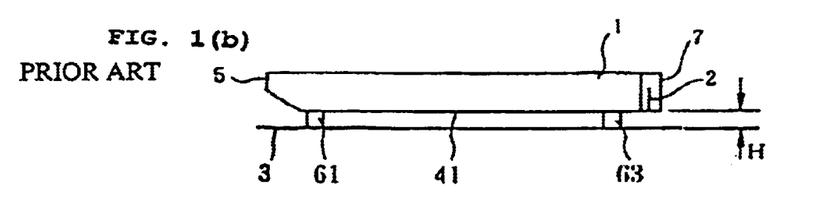
FIG. 1(b) is a side elevation illustrating the contacting condition to the magnetic disk.
Figure 1C:
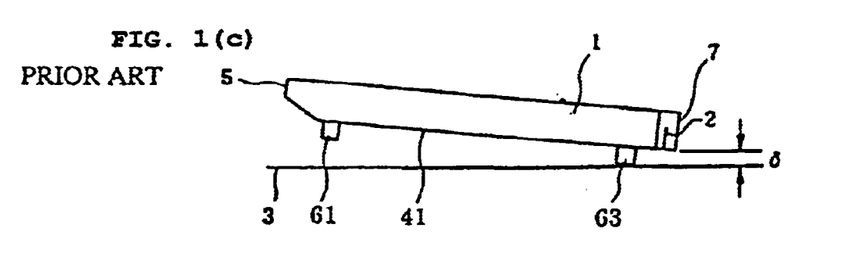
FIG. 1(c) is a side elevation illustrating a flying condition.

FIGS. 1(a)–(c) show a magnetic head slider of the prior art. In the prior art, the magnetic head slider has floating rails 41 and 42, in the longitudinal direction, just opposed to a magnetic disk 3 when it is built into a magnetic disk drive. The magnetic head slider flies over the magnetic disk 3 when the airflow generated by rotation of the magnetic disk 3 enters into an air inflow end 5 and affects the floating rails 41–43, and then conducts the recording/reproducing operation to and from the magnetic disk 3 with an electromagnetic transducer 2 arranged at the area near the air outflow end 7.

It is effective to reduce the contact area of the magnetic head slider in order to prevent the stiction at the time of contacting with a CSS (Contact Start Stop) zone, therefore, projections 61–64 are provided on the rail surfaces of the floating rails 41 and 42. As shown in FIG. 1(b), in order to effectively prevent the stiction while the projections 61–64 are contacting with the magnetic recording, the height H of the projections 61–64 must be necessarily at least 20 nm for the magnetic disk 3 having Ra (average roughness) of about 2 nm. It has been verified experimentally that the stiction cannot be prevented if the height H is less than such value.

However, the prior art explained above has following disadvantages. The magnetic head slider takes a flying condition that the flying height of the air inflow end 5 is higher than one of the air outflow end 7 as shown in FIG. 1(c). If the electro-magnetic transducer 2 is attempted to be located near the magnetic disk 3 by reducing the flying height δ of the magnetic head slider in view of enhancing the recording/reproducing sensitivity, the projections 63 and 64 near the air outflow end 7 may interfere with the surface of the magnetic disk 3. Moreover, in order to prevent the interference of the projections 63 and 64, it is thought to set up the pitch angle of the magnetic head slider, but it is disadvantage in the viewpoint of balance of the flying condition.

DISCLOSURE OF THE INVENTION

It is an object of the present invention to provide a head slider suitable for preventing the stiction to a recording medium.

It is another object of the present invention to provide a head slider which realizes the small flying height while preventing the stiction to a recording medium.

It is further object of the present invention to provide a head slider which achieves the small flying height and improves the recording/reproducing sensitivity to a recording medium.

The objects explained above can be achieved by a head slider which mounts a recording/reproducing element and flies over the recording medium with the airflow generated when the recording medium moves. This head slider comprises a slider body having the air inflow end and an air outgoing end, a rail which is projected from the slider body to define an air bearing surface extended to the outflow end, a projection formed on the rail and between the inflow end and the outflow end, and a recess formed at the outflow end of the rail to make narrow the width of the rail.

According to the present invention, when the recording medium stops to move, the head slider and the recording medium are in contact each other at the projection and the air outflow end of the rail. Since the air outflow end of the rail is rather narrow in width, the stiction can be prevented. Moreover, it is no longer required to form a projection near the outflow end of the rail and therefore the flying height of the recording/reproducing element can be lowered to improve the recording/reproducing sensitivity.

According the other aspect of the present invention, the width of the recording/reproducing element at the surface opposed to the recording medium is narrower than the width of the outflow end of the rail. According to this aspect, the recording/reproducing element is never exposed to the side wall of the recess of the rail and thereby the corrosion of the recording/reproducing element can be prevented.

According to still another aspect of the present invention, the rail comprises a couple of rails, and the width of one rail, where the recording/reproducing element is formed, at the outflow end is wider than the corresponding one of the other rail. According to this aspect, the width of the outflow end of the one rail is set so that the recording/reproducing element is never exposed. Moreover the width of the outflow end of the other rail can be set so that the stiction never occurs.

Moreover, according to still further aspect of the present invention, the recess isolates an area, where the recording/reproducing element is formed, from the air bearing surface of the rail and thereby the area is formed like an island. According to this aspect, the phenomenon that the lubricant creeps up can be prevented, therefore, the stiction can be prevented effectively.

Moreover, according to still further aspect of the present invention, a forward projection and a backward projection are provided on the rail. According to this aspect, the area in which the head slider is in contact with the recording medium can be reduced, therefore, the stiction can be prevented effectively. Namely, the head slider is in contact with the recording medium in the following three condition, first the inflow end and the forward projection, secondly the forward projection and the backward projection, and thirdly the backward projection and the outflow end are in contact with the recording medium. Even in any type of contact condition, the contact area between the head slider and recording medium can be reduced.

BRIEF DESCRIPTION OF THE DRAWINGS

FIGS. 1(a)–(c) show a head slider of the prior art.

FIGS. 2(a)–(c) show a head slider of the present invention.

FIGS. 3(a)–(c) show an electro-magnetic transducer.

FIGS. 4(a) and 4(b) show a modification example of the electromagnetic transducer.

FIGS. 7(a)–(c) show a header slider of the fourth embodiment of the present invention.

FIGS. 8(a) and 8(b) show the process of manufacturing a thin film magnetic head.

DESCRIPTION OF THE PREFERRED EMBODIMENTS

Figures 2A, 2B, 2C:
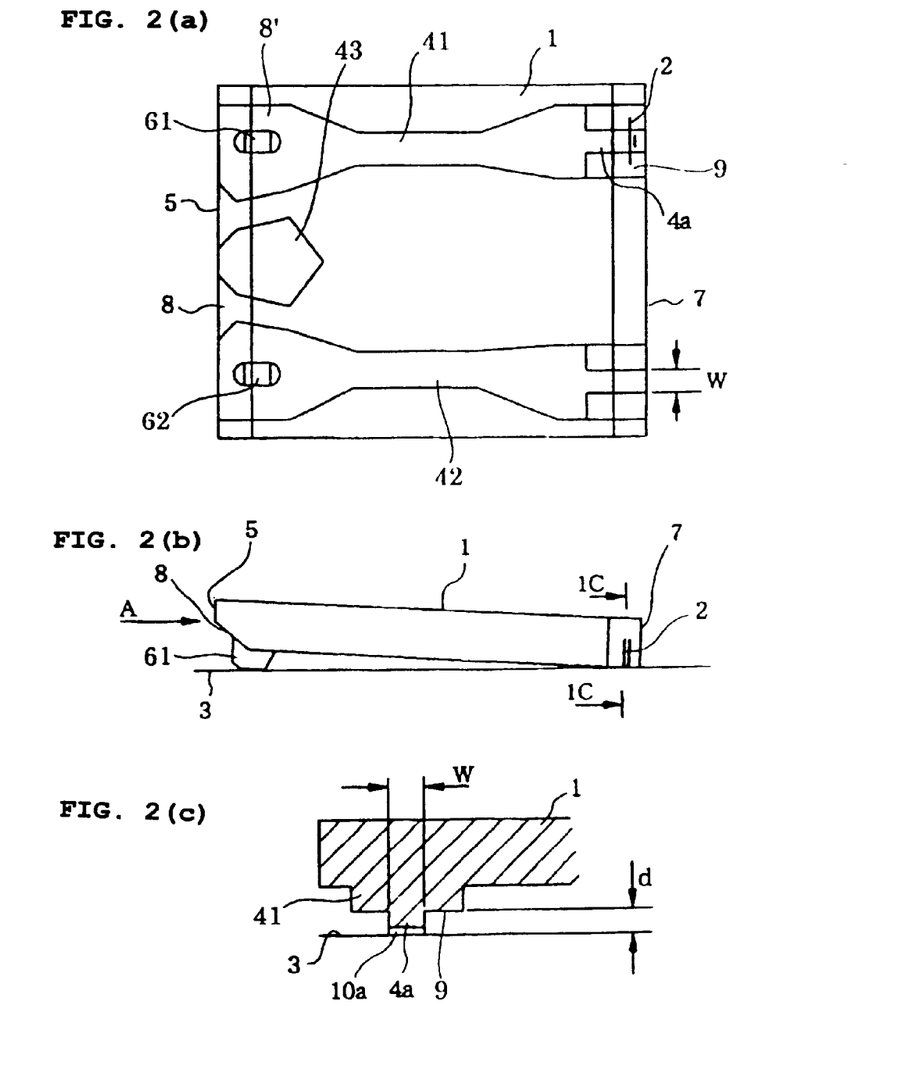
FIG. 2(a) is a front elevation viewed from a side of the floating rail forming surface.
FIG. 2(b) is a side elevation illustrating the contacting condition to the magnetic disk.
FIG. 2(c) is a cross-sectional view along the line 1C—1C of FIG. 2(b).

FIGS. 2(a)–2(c) show a head slider of the present invention. A magnetic head slider is manufactured by forming an electro-magnetic transducer 2 on slider body 1 using the thin film process and by forming floating rails 41–43 on the surface opposing to magnetic disk 3. The floating rails are formed of a couple of side rails 41 and 42 and a center rail 43. The slider body 1 is formed, for example, of alumina-titanium-carbide ($Al_2O_3TiC$).

The magnetic head slider flies over the magnetic disk 3 at the predetermined height with the airflow in the direction of an arrow mark A in FIG. 2(b) due to the rotation of the magnetic disk 3. Moreover, the magnetic head slider has a sloping surface 8 at the air inflow end 5 of the slider body 1 and the floating rails 41 to 43.

The projections 61 and 62 are formed at the boundary between the sloping surface 8 and a rail surface 8' of the floating rails 41 and 42, and are projected toward the magnetic disk 3. With respect to the size of the projections 61 and 62, the contacting area to the magnetic disk 3 are as small as not causing the stiction and are as large as not being worn out easily due to the friction with the magnetic disk 3. For example, the projections 61 and 62 are formed as an elongated column having the minor axis length of about 50–70 $\mu$m, while the width of the floating rails 41 and 42 is about 300 $\mu$m.

As explained above, the projections 61 and 62 are required to have the sufficient height to show stiction-free, for example, about 20 nm in minimum or about 30 nm assuming a margin for the magnetic disk 3 having the surface roughness Ra of about 2 nm. In FIGS. 2(a) and 2(b), the projections 61 and 62 are formed at the boundary between the sloping surface 8 and the rail surface 8' but these may also be formed on only the rail surface 8'.

Figure 3A:
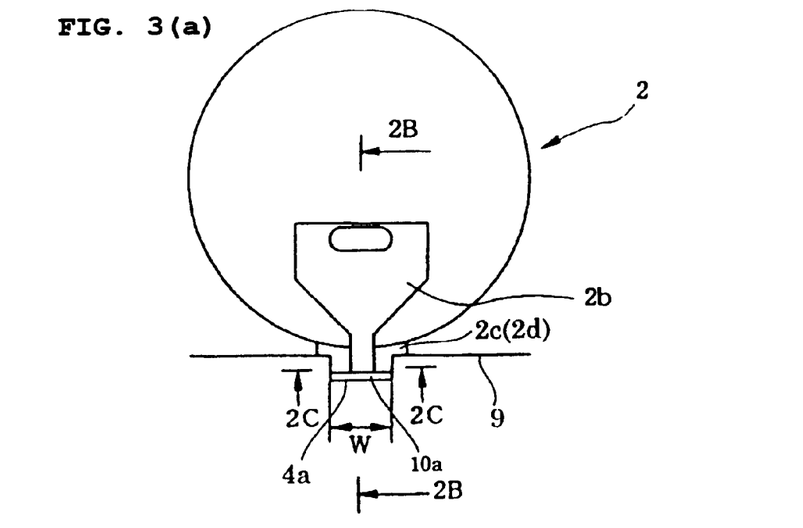
FIG. 3(a) is a front elevation viewed from a side of the air outflow end.
Figures 3B, 3C:
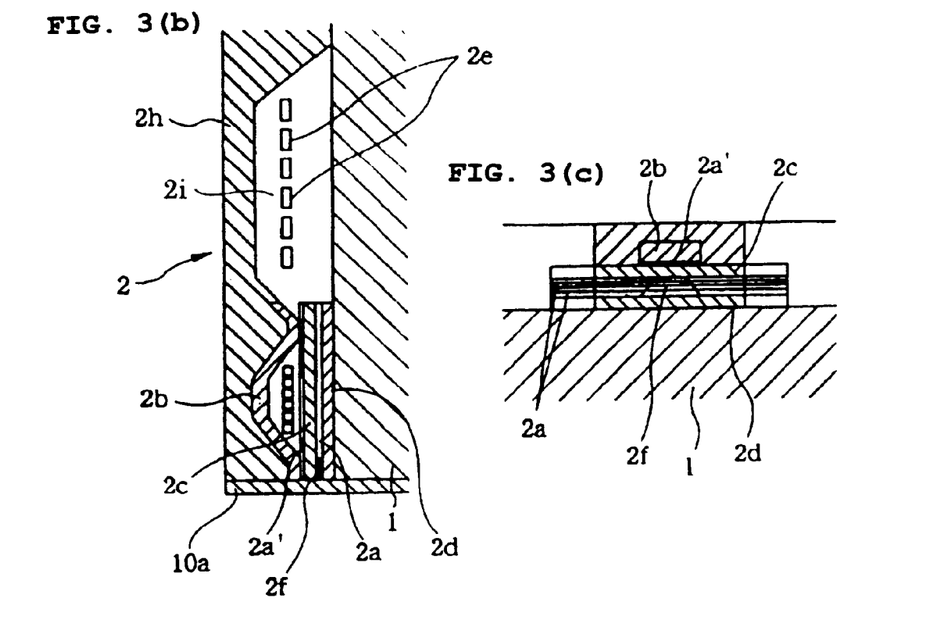
FIG. 3(b) is a cross-sectional view along the line 2B—2B of FIG. 3(b)
FIG. 3(c) is a cross-sectional view along the line 2C—2C of FIG. 3(a).

FIGS. 3(a)–(c) show the electro-magnetic transducer. In these figures, the electro-magnetic transducer 2 is a composite type head which is generally called an MR head and which is formed integrally an inductive element for recording and a magneto-resistive element for reproducing. The electro-magnetic transducer 2 is formed by utilizing the thin film process and the magneto-resistive element and the inductive element are formed in this sequence from the side of slider body (substrate) 1.

The magneto-resistive element is composed, as shown in FIGS. 3(b) and 3(c), of a magneto-resistive layer (MR layer) 2f, a non-magnetic gap layer 2a formed for surrounding the MR layer 2f, and an upper magnetic shield 2c and a lower magnetic shield 2d formed for sandwiching the MR layer 2f and the gap layer 2a.

The inductive element is composed of a lower magnetic pole (the upper shield) 2c, an upper magnetic pole 2b, a non-magnetic gap layer 2a' for forming an interval between the upper and lower magnetic poles 2b and 2c and at the rail surface, a non-magnetic insulating layer 2i formed between both magnetic poles 2b and 2c, and a coil 2e formed in the non-magnetic insulating layer 2i.

In the electro-magnetic transducer 2, as shown in FIG. 3(b), a protection film 2h is formed on the upper magnetic pole 2b of the inductive element and a protection film 10a is formed in the floating surface side of the inductive element and magneto-resistive element.

As shown in FIGS. 2(a)–(c), the electro-magnetic transducer 2 is arranged at the air outflow end 7 of the floating rail 41 and a part of the electro-magnetic transducer 2 is appearing on the rail surface of the floating rail 41. In the floating rail 41, at the air outflow end 7, both sides of the electro-magnetic transducer 2 are engraved along the longitudinal direction of the floating rail 41, and thereby a narrow width portion 4a and recesses 9 are formed.

Namely, the floating rail 41 is narrowed in width at the air outflow end 7 for the contact with the magnetic disk 3. When the magnetic disk 3 having the surface roughness Ra of about 2 nm is considered, it is desirable that the depth d of the recesses 9 of the floating rail 41 be 20 nm or more and the width w of the narrow portion 4a be about 50 to 100 $\mu$m.

In this embodiment, when contacting with the CSS zone, the projection 61 near the air inflow end S and the narrow portion 4a at the air outflow end 7 are in contact with the surface of the magnetic disk 3 as shown in FIGS. 2(b) and 2(c). The narrow portion 4a is as narrow as 50 to 100 $\mu$m in width in comparison with the floating rail 41 of 300 $\mu$m and therefore there is no fear for the stiction to the magnetic disk 3. Moreover, even in the case of the floating condition, since the projection is not provided near the narrow portion 4a, the flying height from the magnetic disk can be reduced.

Figure 4A:
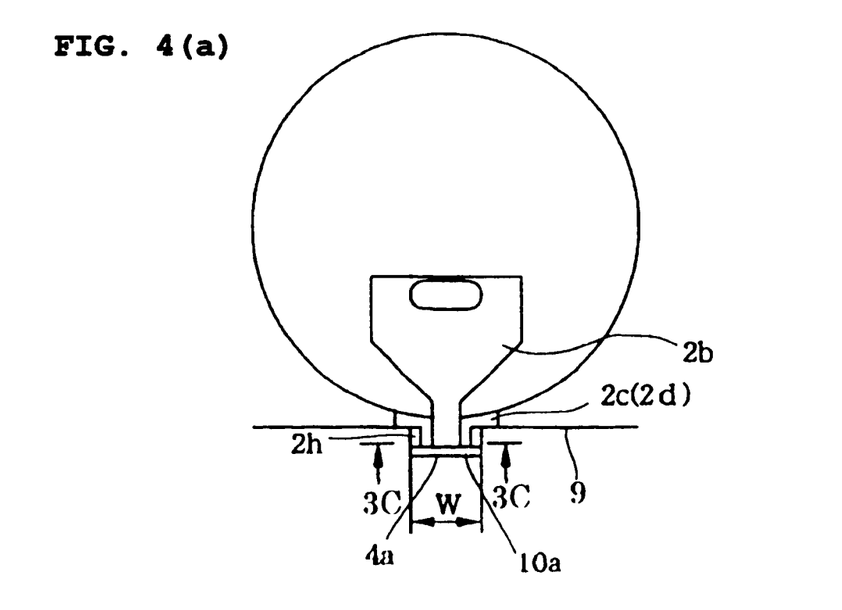
FIG. 4(a) is a front elevation of the electro-magnetic transducer viewed from a side of the air outflow end.
Figure 4B:
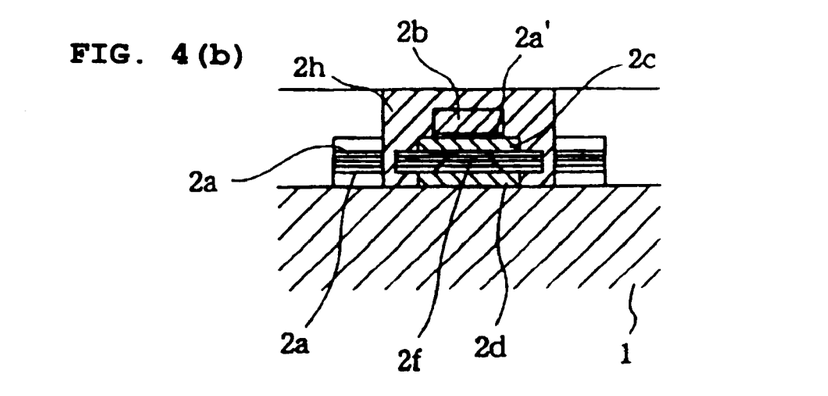
FIG. 4(b) is a cross-sectional view along the line 3C—3C of FIG. 4(a).

FIGS. 4(a) and 4(b) show a modification example of the electro-magnetic transducer. In the electro-magnetic transducer shown in FIGS. 3(a)–(c), since the floating rail 41 where the electro-magnetic transducer 2 is arranged is engraved, the upper and lower shields 2c and 2d are exposed to the side wall of the engraved portion. Therefore, the electro-magnetic transducer 2 potentially has the possibility of corrosion.

This problem can be eliminated, as shown in FIGS. 4(a) and 4(b), by forming the upper and lower shields 2c and 2d of the electromagnetic transducer 2 to such a size as can be accommodated within the narrow portion 4a. Namely, in this embodiment, the magnetic shields 2c and 2d are formed so as to have a step that their tip portions opposed to the magnetic disk 3 are narrowed in width, and the floating rail 41 is engraved at the position adequately isolated from the side edge of the magnetic shields 2c and 2d. As a result, the side wall of the narrow portion 4a is covered with the protection film 2h which is also covering the electromagnetic transducer 2. Thereby, the exposure to the outside can be prevented.

Figure 5:
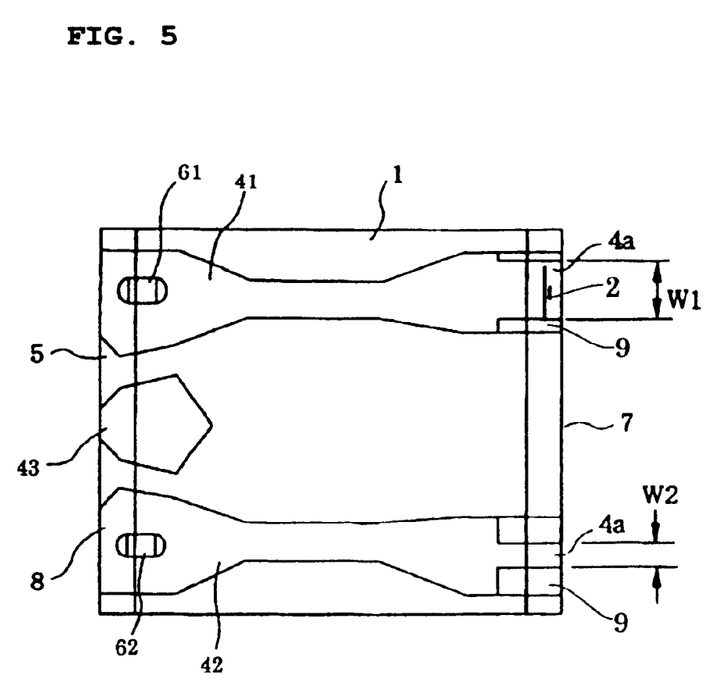
FIG. 5 shows a head slider of the second embodiment of the present invention.

FIG. 5 shows a head slider of a second embodiment of the present invention. For the explanation of the second embodiment, the elements which are substantially same as the above-mentioned embodiment are designated by the same reference numerals, and the explanation is omitted here. In this embodiment, the width w1 of the narrow portion 4a of the floating rail 41 where the electromagnetic transducer 2 is arranged is formed wide and the width w2 of the narrow portion 4a of the floating rail 42 where the electromagnetic transducer 2 is not arranged is formed narrow.

Since the narrow portion 4a of the floating rail 41 where the electro-magnetic transducer 2 is arranged is formed in the width not interring the magnetic shields 2c and 2d, the magnetic shields 2c and 2d are never exposed to the outside. Therefore, there is no fear for the corrosion. Moreover, since the narrow portion 4a where the electromagnetic transducer 2 is not arranged is formed narrow, in comparison with the first embodiment, as much as the widening of the narrow portion 4a of the floating rail 41 where the electro-magnetic transducer is arranged. Therefore, the total contacting area is never enlarged.

Figure 6:
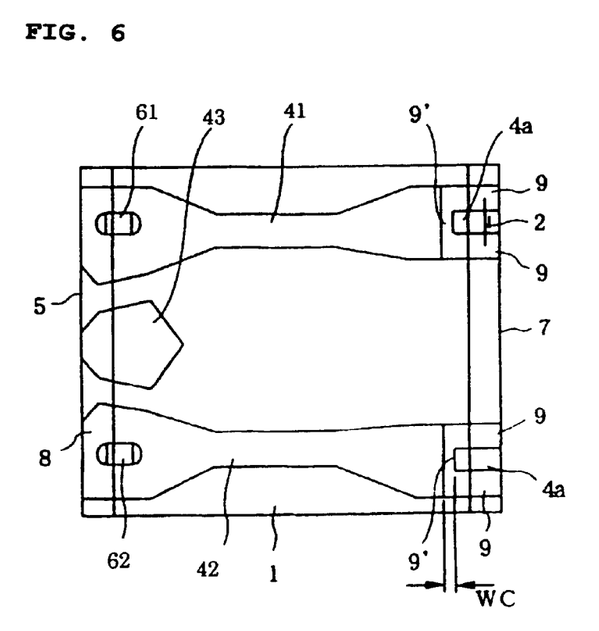
FIG. 6 shows a head slider of the third embodiment of the present invention.

FIG. 6 shows a head slider of a third embodiment of the present invention. This embodiment is a modification for effectively preventing the stiction. The recesses 9 in both right and left sides of the narrow portions 4a are coupled with second recesses 9' crossing the floating rails 41 and 42. As a result, the narrow portion 4a is formed like an island which is capable of preventing that the lubricant creeps up by the capillarity. The second recess 9' has the same depth to both right and left recesses and the width wc of about 5 μm.

Figure 7A:
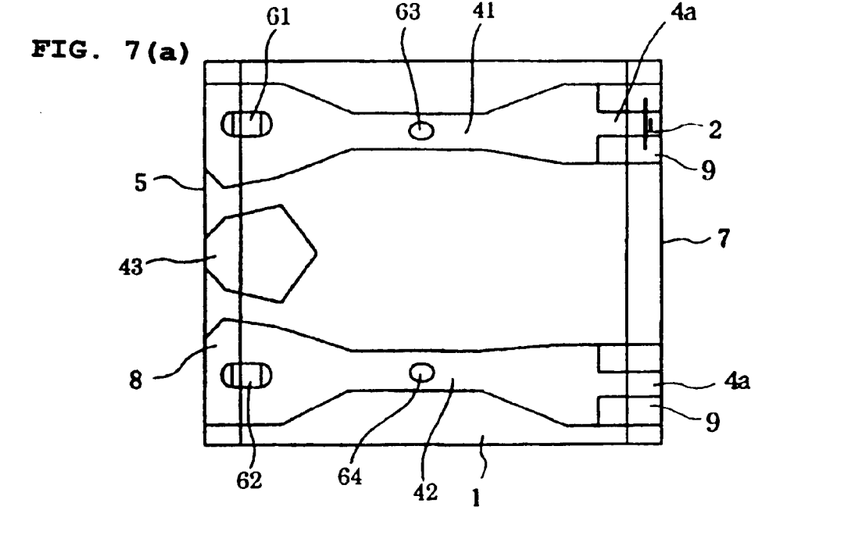
FIG. 7(a) is a front elevation viewed from a side of the floating rail forming surface.
Figure 7B:
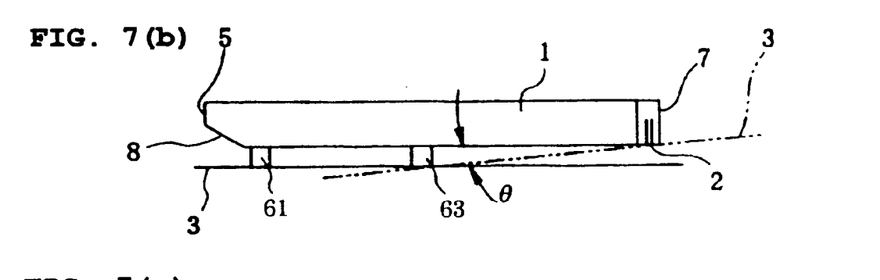
FIG. 7(b) is a side elevation illustrating the contacting condition to the magnetic disk.
Figure 7C:
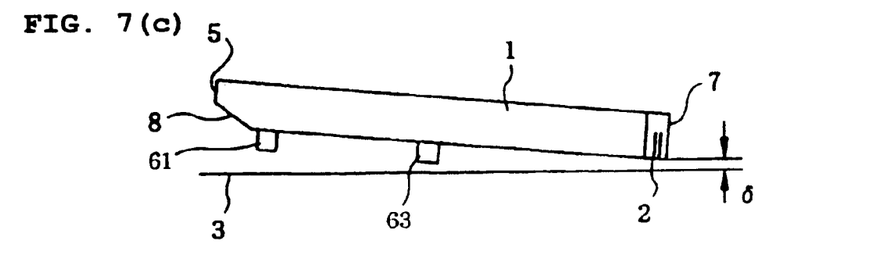
FIG. 7(c) is a side elevation illustrating the flying condition.

FIGS. 7(a)–7(c) show a head slider of a fourth embodiment of the present invention. In this embodiment, each floating rail 41 and 42 is provided with the backward projections 63 and 64, in addition to the forward projections 61 and 62 in the side of the air inflow end 5. The backward projections 63 and 64 as shown in FIG. 7(b) have the height of 20 nm or more not to cause the stiction at the time of contacting with the magnetic disk 3.

Moreover, it is preferable, as shown in FIG. 7(c) that the backward projections 63 and 64 are provided at the area so that they are not in contact with the magnetic disk 3 when the magnetic head slider flies. In this embodiment, the backward projections 63 and 64 has the height almost equal to the forward projections 61 and 62 provided near the air inflow end 5, and are arranged at the center of each floating rail 41 and 42.

Therefore, in this embodiment, since the projection 61–64 are in contact with the CSS zone of the magnetic disk 3 under normal condition as shown in FIG. 7(b), the contacting area with the magnetic disk 3 can be reduced and thereby the stiction can be prevented. In addition, even if the air outflow end 7 is in contact with to the CSS zone as shown by a chain line in FIG. 7(b), the angle Θ to the magnetic disk 3 becomes large. Therefore, the contacting area becomes small and the possibility for the stiction is also lowered.

Figure 8A:
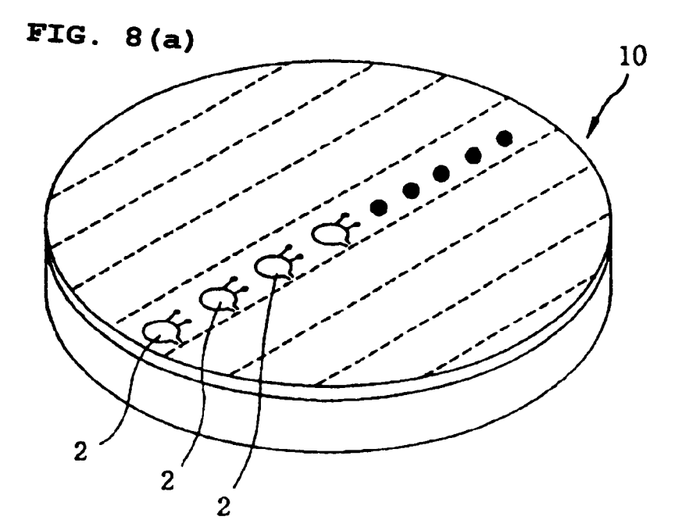
FIG. 8(a) is a perspective view of a wafer.
Figure 8B:
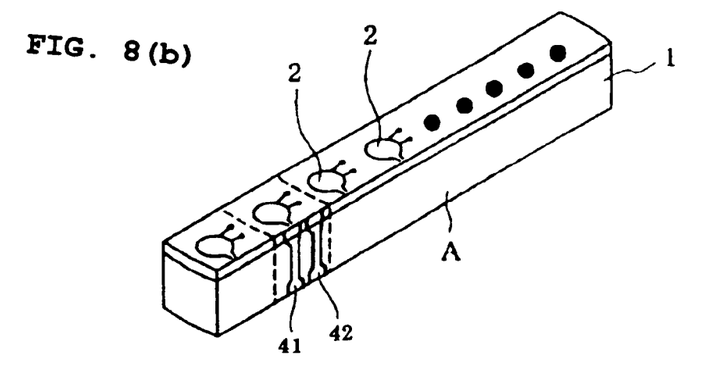
FIG. 8(b) is a perspective view illustrating a condition where a bar is cut out.

FIGS. 8(a) and 8(b) show the process of manufacturing the magnetic head slider. The magnetic head slider can be obtained by forming a plurality of electro-magnetic transducers 2 on a ceramic wafer 10 such as alumina-titanium-carbide ($Al_2O_3TiC$) using the thin film process as shown in FIG. 8(a), then cutting the wafer by a dicing saw into bars that the electromagnetic transducers 2 are arranged in a line as shown in FIG. 8(b), then forming the floating rails 41 and 42 on the cutting surface A of the magnetic pole side of each bar by the process explained later, and then separating from the bar. If a sloping surface 8 as shown in FIG. 2 is formed at the air inflow end 5, the chamfering process applies to the edge of the bar after the cutting process of the wafer into the bar and before the forming process of the floating rails.

FIG. 9 shows the process of forming the floating rails to the bar. First, the floating rails are formed by etching the floating rail forming surface (surface A of FIG. 8(b)) of the bar. Thereafter, as shown in FIG. 9(a), an adhesion layer 10a of about 2 nm in thickness is formed on the rail surface of the floating rail by the sputtering of Si or SiC, and then a protection layer 10b is laminated thereon. The protection layer 10b is formed with the diamond-like carbon (DLC) film by the plasma CVD process and its thickness is about 20 nm or more, for example, of about 30 nm.

Figure 9A:
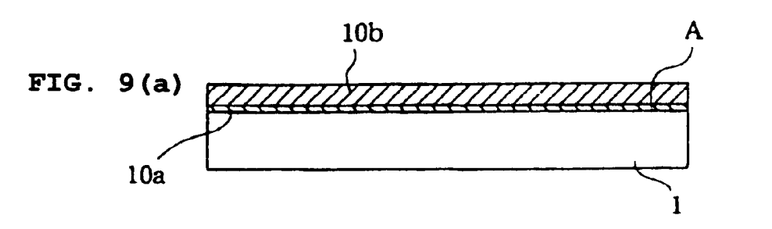
FIGS. 9(a)–(e) show the process of forming the floating rail.
Figure 9B:
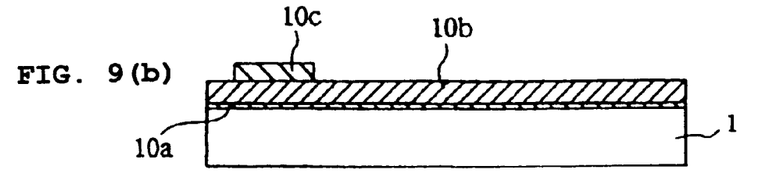
Figure 9C:
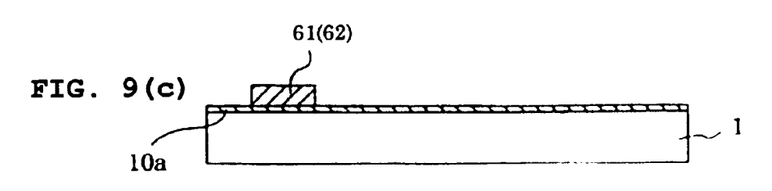

Thereafter, as shown in FIG. 9(b), the resist 10c is formed on the area of the protection layer 10b to form the projections 61 and 62. The resist 10c is coated corresponding to the projections 51 and 62 in the side of the air inflow end 5 and, if necessary, to the backward projections 63 and 64. Thereafter, the remaining portion not covered with the resist 10c is etched by the ion milling process or the like, and thereby the projections 61 and 62 consisting of DLC are formed as shown in FIG. 9(c).

Figure 9D:
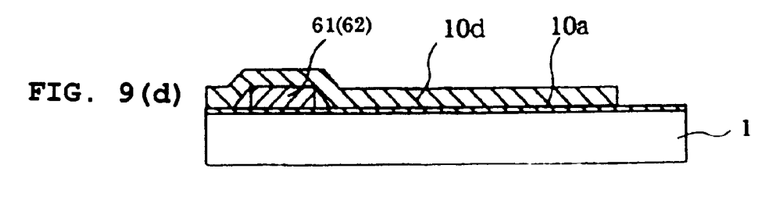
Figure 9E:
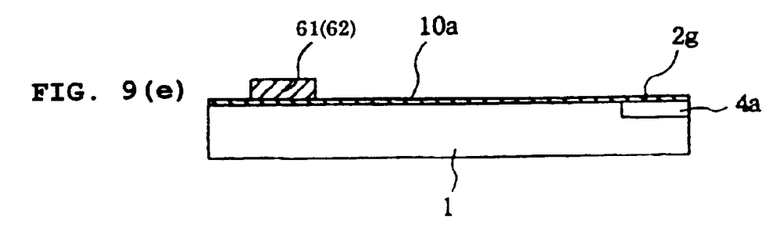

Moreover, as shown in FIG. 9(d), the surface of floating rail is coated with the resist 10d, except the area corresponding to the recess 9. Thereafter, as shown in FIG. 9(e), the narrow portion 4a is formed on the floating rail by etching the area corresponding the to the recess 9 and then the resist 10d is removed. With the processes explained above, the magnetic head slider as shown in FIGS. 2(a)–2(c) can be obtained. In the magnetic head slider, the floating rail including the narrow portion 4a is covered with the adhesion layer 10a which is also working as the protection film, and the projections 61 and 62 consisting of DLC are provided in the predetermined positions.

INDUSTRIAL APPLICABILITY

As will be apparent from above explanation, the present invention can provide the small flying height and can prevent the stiction to the magnetic disk.

The head slider of the present invention can realize the small flying height while preventing the stiction to the magnetic disk. Therefore, the recording/reproducing sensitivity to the recording medium can be improved and therefore the high density recording can be realized.

Particularly, the magnetic disk drives have been greatly improved in the recording capacity and is still required to further increase the recording capacity. From this point of view, the head slider of the present invention is very effective. Moreover, the present invention is also effective not only to the magnetic disk drive but also to an optical disk drive using the head slider.

What is claimed is:

1. A head slider mounting a recording/reproducing element and adapted to fly over a recording medium with the air flow generated when said recording medium moves, comprising:
   a slider body having an air inflow end and an air outflow end;
   at least one rail projected from said slider body and defining an air bearing surface which is extended to said air outflow end;
   at least one projection formed on said rail and between said air inflow end and said air outflow end; and
   a recess formed on said rail only at said air outflow end of said rail to make the width of said rail narrow at said air outflow end.

2. The head slider as claimed in claim 1, wherein a width of the recording/reproducing element at said air bearing surface opposed to the recording medium is formed narrower than said width of said rail at said air outflow end.

3. The head slider as claimed in claim 1, wherein said rail comprises a couple of rails and said recess is formed at said air outflow end of each said rail.

4. The head slider as claimed in claim 3, wherein the recording/reproducing element is formed at said air outflow end is of one rail, and the width of said one rail at said air outflow end is wider than a corresponding width of the other rail.

5. The head slider as claimed in claim 1, wherein said recess isolates an area, where the recording/reproducing element is formed, from said air bearing surface of said rail and forms said area like an island.

6. The head slider as claimed in claim 1, wherein said projection comprises a first projection formed near said air inflow end and a second projection formed between said first projection and said air outflow end.

7. A head slider mounting a recording/reproducing element and adapted to fly over a recording medium with the air flow generated when said recording medium moves, comprising:
   a slider body having an air inflow end and an air outflow end;
   at least one rail projected from said slider body and defining an air bearing surface which is extended to said air outflow end;
   at least one projection outwardly formed on said air bearing surface and between said air inflow end and said air outflow end; and
   a recess inwardly formed on said rail, on said air bearing surface, and only at said air outflow end of said rail to make the width of said rail narrow at said air outflow end,
   wherein said recess, said air bearing surface and said at least one projection have different heights relative to each other.

8. A head slider mounting a recording/reproducing element and adapted to fly over a recording medium with the air flow generated when said recording medium moves, comprising:
   a slider body having an air inflow end and an air outflow end;
   at least one rail projected from said slider body and defining an air bearing surface which is extended to said air outflow end;
   at least one projection formed on said rail and between said air inflow end and said air outflow end; and
   a recess formed starting from said rail downstream of said at least one projection and extending to said air outflow end of said rail to make the width of said rail narrow at said air outflow end only.

* * * * *